April 26, 1960 T. O. ADAMS 2,934,194
WORK FEED CONSOLE
Filed Jan. 13, 1959 11 Sheets-Sheet 2

INVENTOR.
THOMAS O. ADAMS
BY
Williams & Tilbury
ATTORNEYS

April 26, 1960     T. O. ADAMS     2,934,194
WORK FEED CONSOLE
Filed Jan. 13, 1959     11 Sheets-Sheet 3

FIG. 4

INVENTOR.
THOMAS O. ADAMS
BY
ATTORNEYS

April 26, 1960     T. O. ADAMS     2,934,194
WORK FEED CONSOLE

Filed Jan. 13, 1959     11 Sheets-Sheet 6

INVENTOR.
THOMAS O. ADAMS
BY
*Williams & Iberry*
ATTORNEYS

April 26, 1960     T. O. ADAMS     2,934,194
WORK FEED CONSOLE Filed Jan. 13, 1959     11 Sheets-Sheet 7

*INVENTOR.*
THOMAS O. ADAMS
BY
*Williams & Tilbury*
ATTORNEYS

INVENTOR.
THOMAS O. ADAMS
BY
Williams & Pilbury
ATTORNEYS

April 26, 1960 T. O. ADAMS 2,934,194
WORK FEED CONSOLE
Filed Jan. 13, 1959 11 Sheets-Sheet 9

INVENTOR.
THOMAS O. ADAMS
BY
Williams & Tilbury
ATTORNEYS

April 26, 1960 T. O. ADAMS 2,934,194
WORK FEED CONSOLE

Filed Jan. 13, 1959 11 Sheets-Sheet 11

INVENTOR.
THOMAS O. ADAMS
BY
ATTORNEYS

United States Patent Office 2,934,194
Patented Apr. 26, 1960

2,934,194

WORK FEED CONSOLE

Thomas O. Adams, Canton, Ohio, assignor to E. W. Bliss Company, Canton, Ohio, a corporation of Delaware Application January 13, 1959, Serial No. 786,620

9 Claims. (Cl. 198—19)

This invention relates in general to means for feeding workpieces cyclically into mechanisms which consecutively act upon the workpieces until an end product is produced. More particularly, the invention relates to a self-contained work-feed console adapted to provide a complex motion required in feeding and indexing workpieces from one station to another.

I am familiar with the construction and operation of so-called "transfer feed presses" in which workpieces are indexed from station to station internally within the press. This, however, is a very highly specialized type of machinery not adaptable to a variety of uses. It is, therefore, the primary object of my invention to provide a self-contained work-feed console which is adaptable to more than one type of mechanism, and which may be employed in association with a press to provide the functions of a transfer feed press, or may be provided in association with a group of machines each performing an operation unique to each particular machine. It is another object of my invention to provide a work-feed console adapted to index workpieces to a bank of machines in tandem such as presses and the like, in a novel and improved manner.

Other objects and advantages of my invention will become apparent upon a reading of the following specification taken in conjunction with the included drawings and claims.

Reference will now be made to the drawings in greater detail, and it will assist in an understanding of the invention if Figures 1 through 5 are considered both severally and jointly as the immediate discussion of the mechanism develops.

Figure 1:
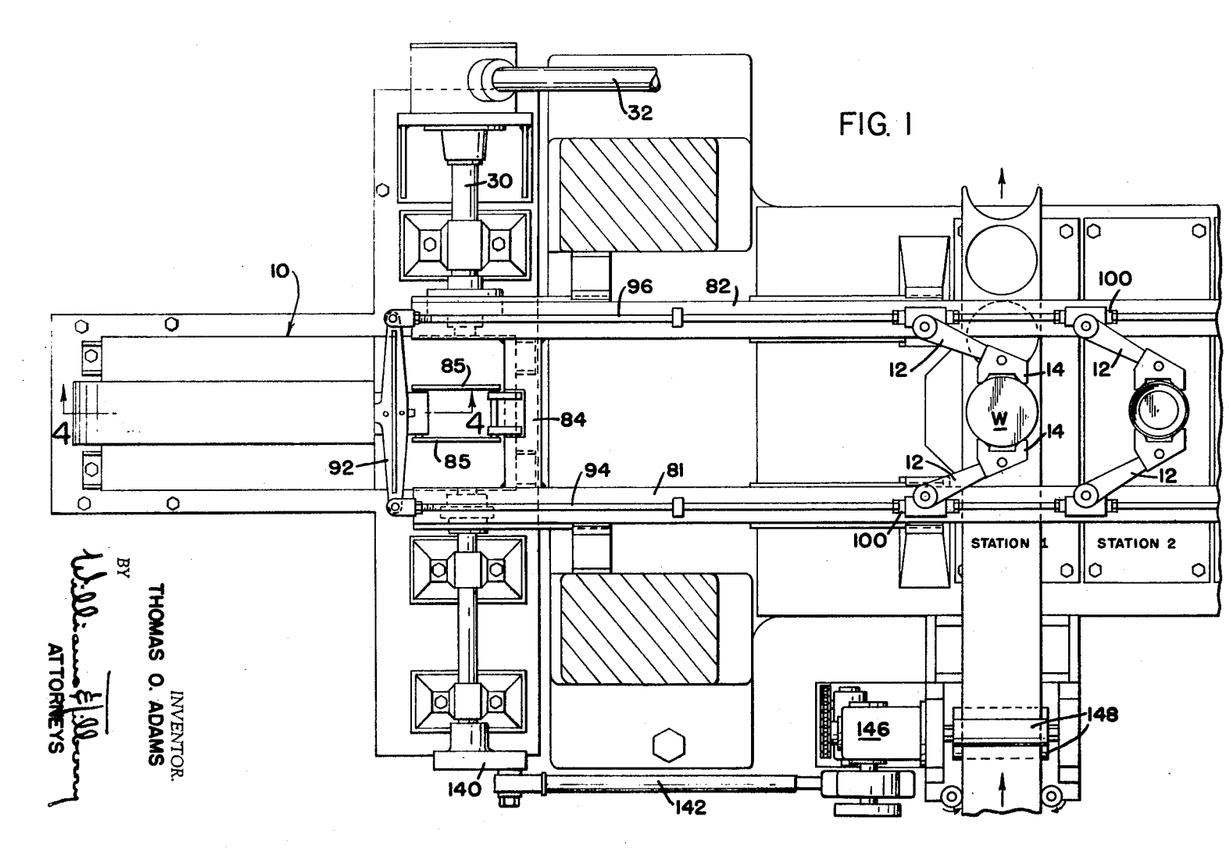
Figure 1 is a plan view of a preferred embodiment of the invention showing the transfer feed mechanism in a retracted position and with the workpiece engaging arms in contact with workpieces.
Figure 2:
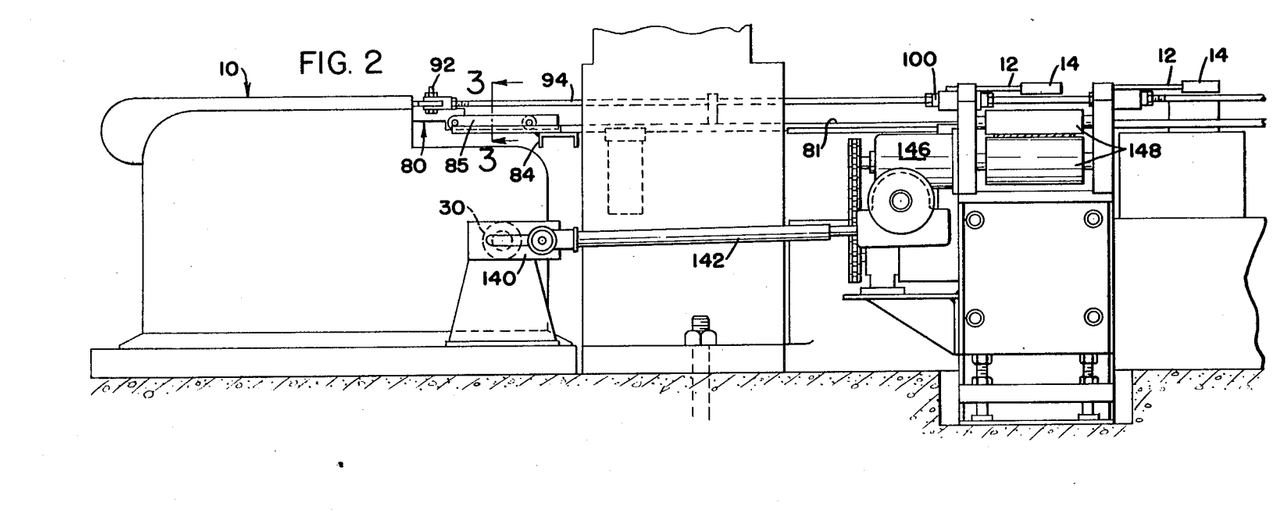
Figure 2 is an elevational veiw of the preferred embodiment of the invention shown in Figure 1.
Figure 3:
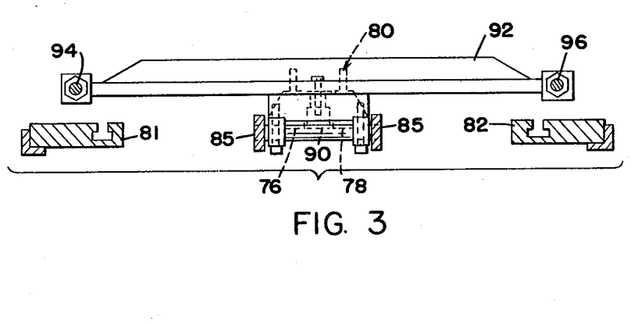
Figure 3 is a fragmentary section taken on the line 3—3 of Figure 2.

The general organizaiton and function of the console 10 is directed toward actuating work gripping arms 12, having fingers 14, to make contact with a workpiece W (see Figure 1). After contact is made between workpiece engaging fingers 14 and the workpiece W, means are provided for advancing the arms 12 together with the workpiece from station 1 to station 2, and so forth. Thereafter, the arms 12 are pivoted outwardly away from the workpiece in order to provide clearance for an operation to be performed upon the workpiece by an associated mechanism such as the die or punch of a press and; following which the arms are retracted to their original stations preparatory to repeating the cycle of operation. In this manner, a workpiece is indexed from station to station as required depending on the number of operations to be performed on the workpiece, and this workpiece feeding arrangement can be employed whether in association with a single mechanism such as a press having multiple acting dies, specialized machinery, or a bank of presses arranged in tandem to receive a workpiece from press to press. It is necessary, of course, that the movement of the console be synchronized with the movement of the work performing portions of the machinery with which the console is associated. This is not a subject of this invention, however, and synchronization will be assumed for the purpose of this discussion.

Figure 4:
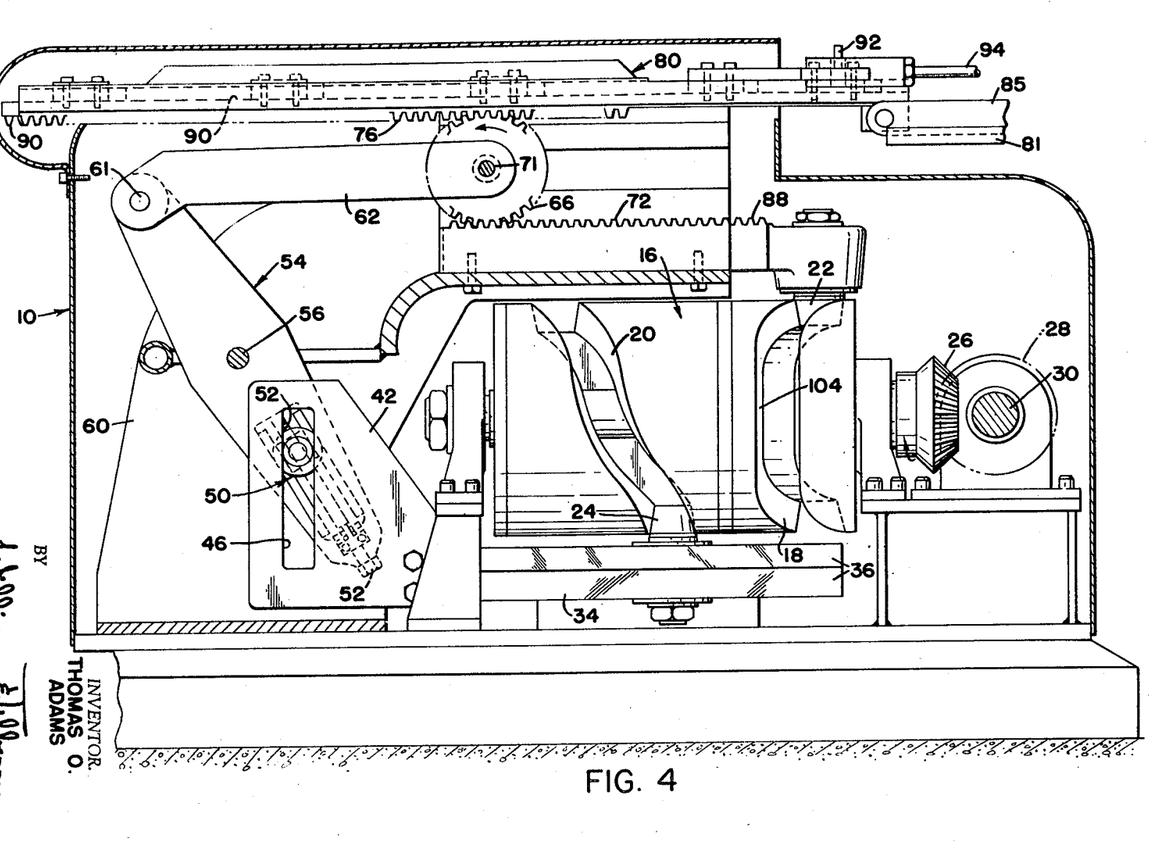
Figure 4 is an elevational view in section taken on the line 4—4 of Figure 1 and showing the apparatus in the fully retracted position.
Figure 5:
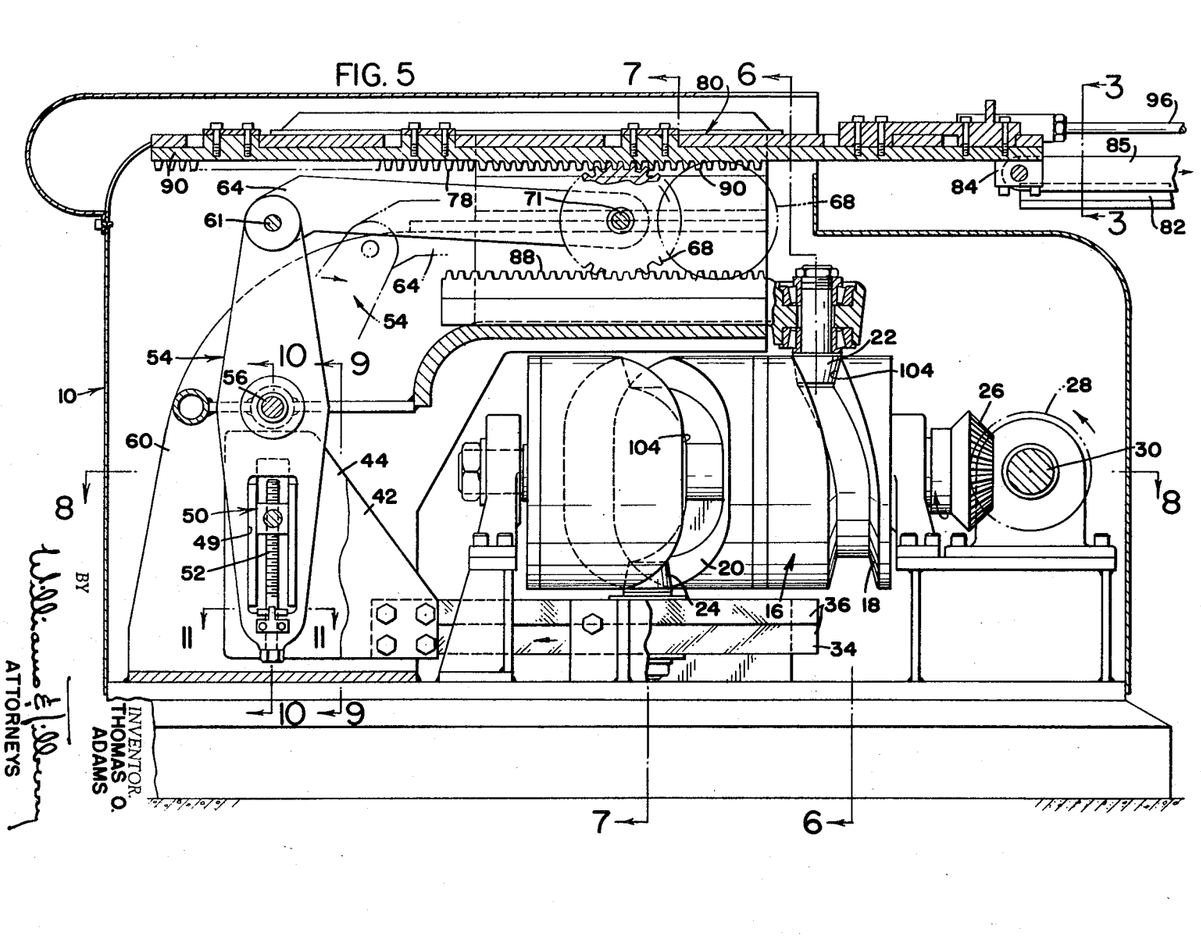
Figure 5 is an elevational view partly in section similar to Figure 4 and showing the mechanism in a partially extended position.

Referring now more particularly to Figures 4 and 5, ti will be seen from a study of these figures tha two basic motions are involved in the functioning of the console. The first motion actuates the work engaging arms 12, and the second motion advances the arms from one station to a second station. These two motions are then reversed but the reversal of the motion will be considered as a counterpart of the initial movement.

Figure 8:
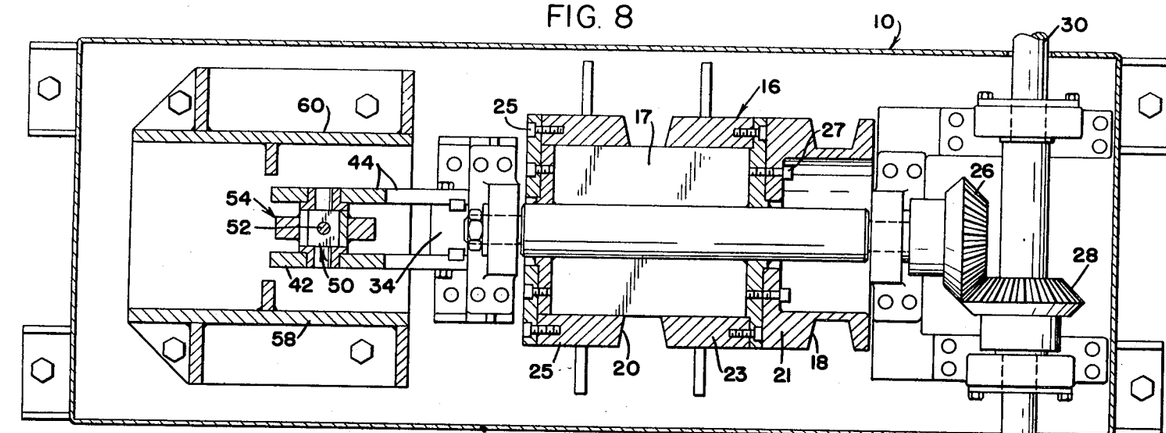
Figure 8 is a plan view in section taken on the line 8—8 of Figure 5.

The heart of the console resides in the cylindrical cam 16 provided with cam grooves 18 and 20 adapted to engage and guide cam followers 22 and 24 respectively. The cylindrical cam 16 is provided with a bevel gear 26 which is drivingly meshed with a second bevel gear 28 secured to console drive shaft 30. Console drive shaft 30 is in turn connected to power take-off shaft 32 by similar bevel gear means not shown (see Figure 1). From an inspection of Figure 8, it will be observed that cam 16 comprises a cylinder 17 upon which sleeves 21, 23, and 24 are secured. Adjustments of cam grooves 18 and 20 are readily made by removing end bolts 25 and/or 27 wherein sleeves 21, 23, and 24 may be quickly removed and modified sleeves replaced. For simplicity and clarity of exposition, the kinematic means associated with cam followers 22 and 24 will now be separately discussed.

Figure 6:
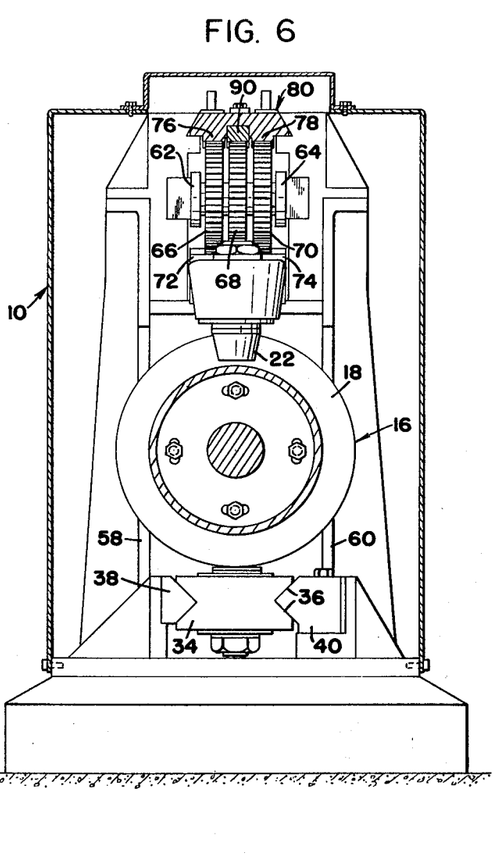
Figure 6 is a section taken on the line 6—6 of Figure 5.
Figure 9:
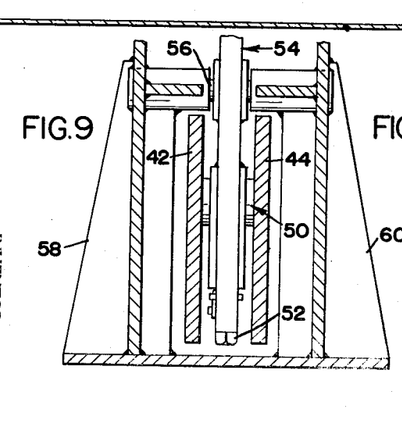
Figure 9 is a fragmentary sectional view taken on the line 9—9 of Figure 5.
Figure 10:
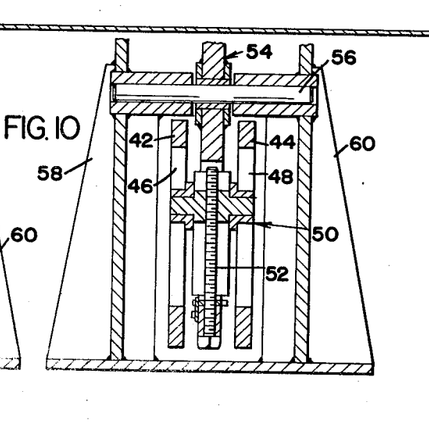
Figure 10 is a fragmentary sectional view taken on the line 10—10 of Figure 5.
Figure 11:
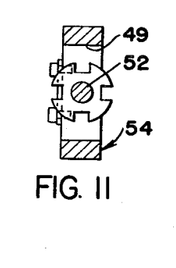
Figure 11 is a fragmentary sectional view taken on the line 11—11 of Figure 5.

Considering first the means for indexing the work holding arms 12 from position 1 to position 2 (see Figure 1), it will be seen from an examination of Figures 4 and 5 that cam follower 24 is secured to a slide bar 34 having concave V-aligned surfaces 36 adapted to be guided by ways 38 and 40 (see also Figure 6). Slide bar 34 has fastened to it at one end a pair of upstanding plate members 42 and 44 (see also Figures 9 and 10) having slotted portions 46 and 48 adapted to receive therein an adjustable nut 50 in threaded engagement with a bolt 52 secured to the lower portion of rocker arm 54 and aligned in rocker arm slot 49. Rocker arm 54 is pivotally mounted on a cross-shaft 56 which is journaled in supporting frame members 58 and 60. Thus, it will be observed that the throw imparted to rocker arm 54 by slide bar 34 may be adjusted by the position of nut 50 in contact with slots 46 and 48 of plates 42 and 44.

Figure 26:
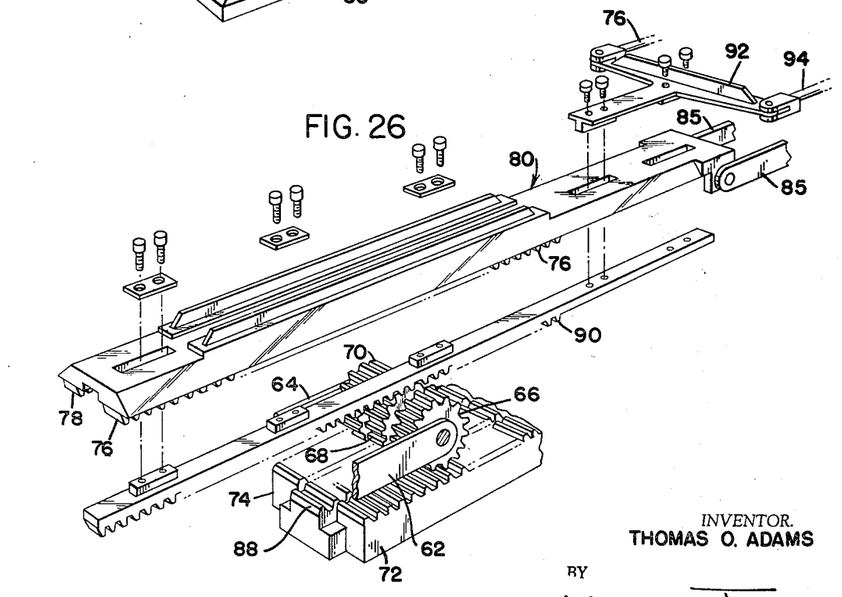

The upper end of rocker arm 54 is pivotally connected at 61 to a pair of drag links 62 and 64 (see also Figures 6 and 26) to which are journaled at their opposite ends a triad of gears 66 and 68 and 70 on shaft 71. Gears 66 and 70 are adapted to run in stationary racks 72 and 74 while at the same time engaging rack portions 76 and 78 of rack member 80. Rack member 80 is in turn drivingly connected to a pair of links 85 and supported by a cross member 84 which in turn drives the conveyor bars 81 and 82.

Figure 7:
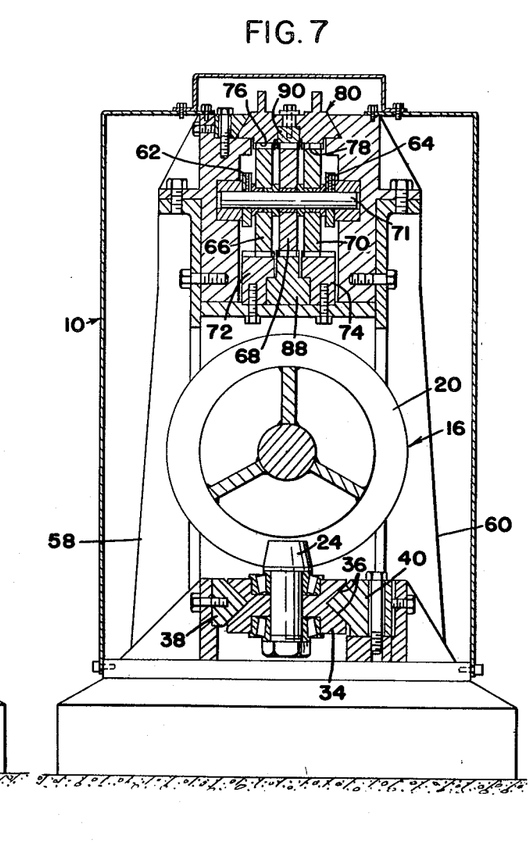
Figure 7 is a section taken on the line 7—7 of Figure 5.

Considering cam follower 22 (see Figures 4 and 5), it will be observed that it is integrally secured to rack member 88 disposed between racks 72 and 74. However, unlike racks 72 and 74, rack 88 is slidably mounted to be horizontally reciprocated by the movement of cam follower 22. Gear 68, rotatably mounted between gears 66 and 70, rides on rack 88 and also makes engagement with gear rack 90 (see Figures 6 and 7). Gear rack 90 is in turn drivingly connected to cross yoke 92 (see Figure 1) which in turn is fastened to connecting rods 94 and 96, carried on conveyor bars 81 and 82 respectively.

Figures 12, 13, 14, 15:
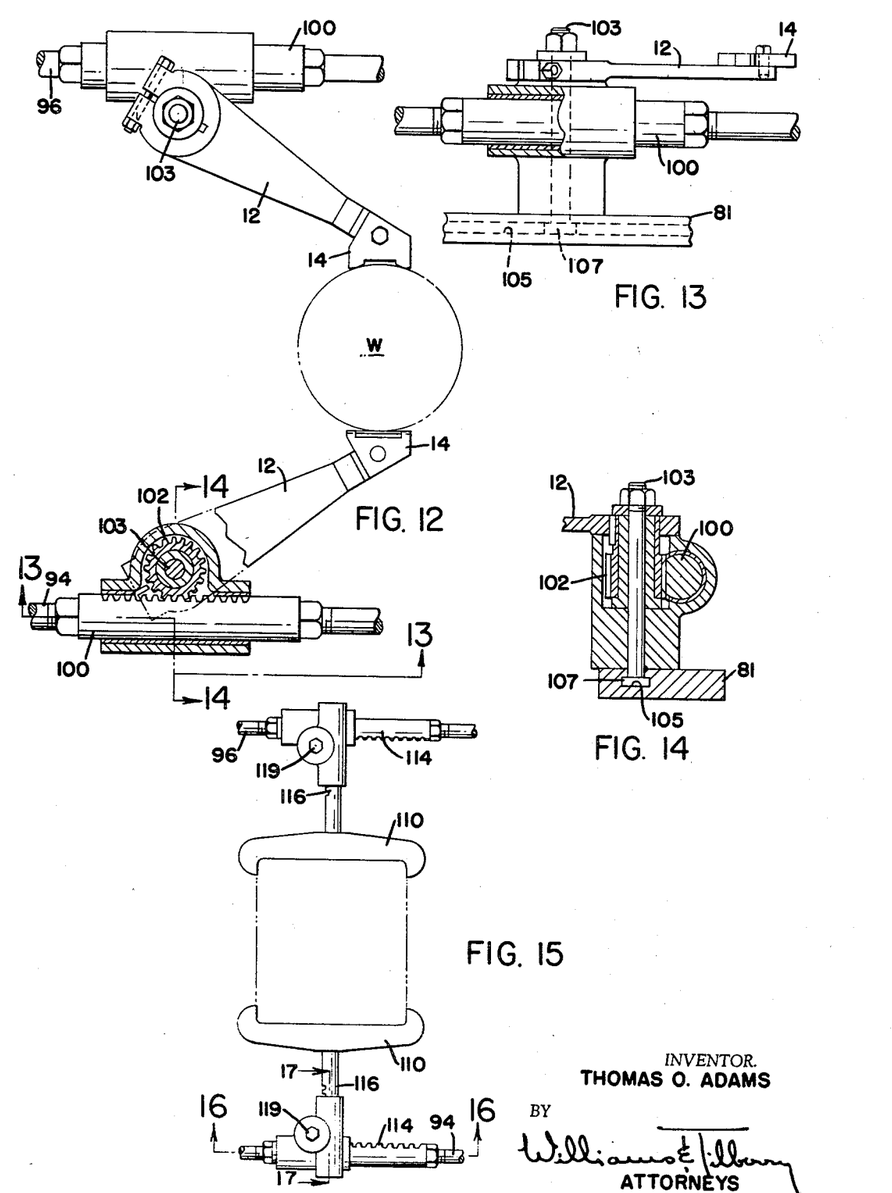
Figure 12 is a fragmentary enlarged portion of Figure 1 with parts in section showing the operating means of the work engaging arms.
Figure 13 is an end angle fragmentary sectional view taken on the line 13—13 of Figure 12.
Figure 14 is a fragmentary sectional view taken on the line 14—14 of Figure 12.
Figure 15 is a fragmentary plan view of a modified form of workpiece engaging arms.

Considering now Figures 4 and 5 consecutively, Figure 4 shows the console in the retracted position with cam groove 18 about to urge cam follower 22 rearwardly to the left as seen in Figure 4. The rearward movement of cam follower 22 causes gear rack 68 to correspondingly move rearwardly and rotate gear 68 in a clockwise direction to urge gear rack 90 forward or to the right as seen in Figure 4 (see also Figures 6 and 7). When gear rack 90 moves forward cross-yoke 92 secured to gear rack 90 also moves forward to push connecting rods 94 and 96 to the right. Referring now to Figures 12, 13, and 14, it will be seen that the portions of connecting rods 94 and 96 adjacent workpiece holding arms 12 are provided with rack segments 100 adapted to make engagement with pinion 102, supported on shaft 103, so as to pivot workpiece holding arms 12 inwardly into contact with the workpiece W.

It will be noted that shafts 103 are provided with T-shaped bases 107 adapted to slide in T-slots 105 milled in both conveyor bars 81 and 82. This arrangement enables quick linear adjustments to be made to the position of arms 12 and 14 responsive to adjustments made in the throw of rocker arm 54. After contact is made with the workpiece, cam follower 22 is then engaged by a dwell portion 104 of cam groove 18 which acts to maintain workpiece holding arms 12 stationary (see Figure 4). Cam groove 20 then urges cam follower 24 rearwardly to set into motion the kinematic chain of events already described, wherein slides 94 and 96 are advanced from left to right as best seen in Figure 1. Inasmuch as all three racks 76, 78, and 90 must advance in unison with uniform rotation of gears 66, 68, and 70 during the dwell of rack 88, the connecting rods 81 and 82 mounted on conveyor bars 94 and 96 move forward in unison with slides 94 and 96 to transpose workpiece W from station 1 to station 2. Cam groove 18 thereafter urges cam follower 22 forwardly to in effect reverse its subsequent movement and to pivot arms 12 outwardly away from workpiece W. The movement of cam follower 24 is thereafter directed by cam groove 20 in a forward direction to reverse the movement of slides 94 and 96. When the console is once again in the position shown in Figure 4, the cycle has been completed and is ready to repeat. Thus, it will be seen that a workpiece can be indexed from station to station without limit by repetitive cycles of operation as set forth hereinabove. When the distance between stations need be changed, this is compensated for by adjusting the stroke of arm 54, already described. The workpiece holding arm assemblies may be repositioned by means of the T-bases 105 and T-slots 107 previously described.

Figures 16, 17, 18:
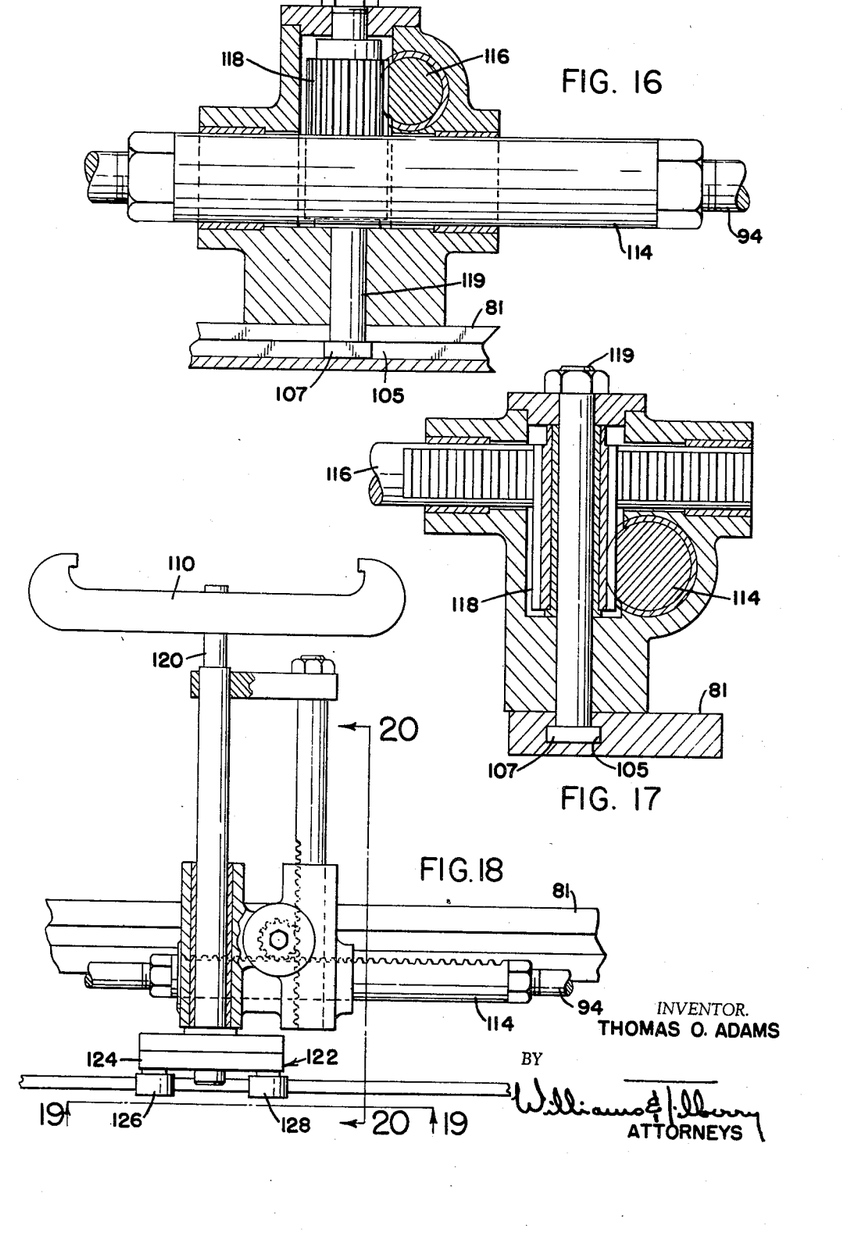
Figure 16 is an enlarged fragmentary sectional view taken on the line 16—16 of Figure 15.
Figure 17 is an enlarged fragmentary sectional view taken on the line 17—17 of Figure 15.
Figure 18 is a modified plan view of workpiece engaging arms similar to those arms shown in Figure 15 but modified in order that the workpiece may be revolved 180°.

Referring now to Figures 15, 16 and 17, transverse acting gripping means 110 may be employed in combination with a combination of racks 114, 116, and interconnecting gear pinion 118 supported on shaft 119. It will be seen that this gripping means is similar to that shown in Figure 12 except that the members 110 move transversely toward the workpiece instead of being moved arcuately into engagement therewith.

Figure 19:
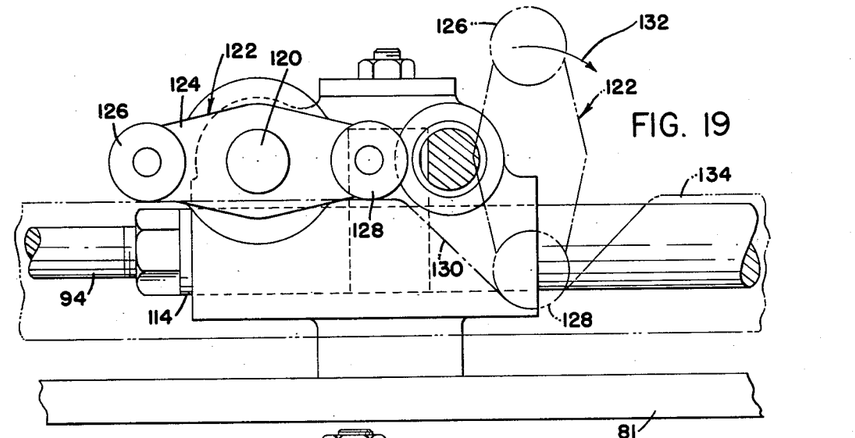
Figure 19 is an enlarged fragmentary elevational view partly in section taken on the line 19—19 of Figure 18 further illustrating the means for revolving a workpiece 180°.
Figure 20:
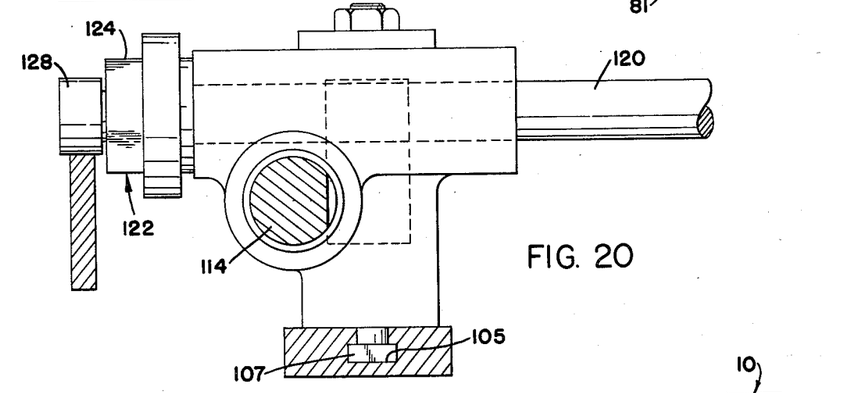
Figure 20 is a fragmentary elevational view partly in section taken on the line 20—20 of Figure 18 showing yet another view of the workpiece revolving means.

Ancillary to work handling apparatus used in association with my console is a means for revolving a workpiece 180° so that work may be performed on both surfaces from one side of the machine. To this end, the species shown in Figure 15 may be modified as shown in Figures 18, 19, and 20, wherein the workpiece engaging means 110 are mounted on a spindle 120 adapted to be revolved by means generally indicated at 122, and best shown in Figure 19. A rocker arm 124 is shown pivotally mounted on the ends of spindle 120 and carrying a pair of rollers 126 and 128 adapted to follow a cam surface 130 thereby flipping bracket 124 in the direction indicated by the arrow 132. In this manner, when roller 126 makes engagement with surface 134, the workpiece has been revolved 180°.

Referring once more to Figure 1, a synchronizing power take-off arrangement including a crank 140, a crank shaft 142, and work feed roll drive means 146 may be adapted to drive work strip engaging rolls 148 if desirable in certain applications.

Figure 21:
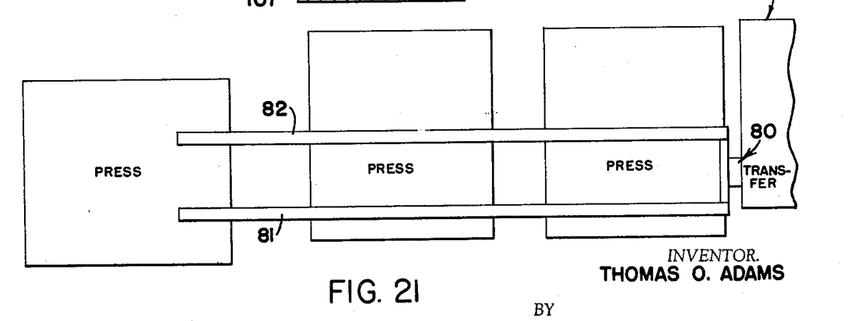
Figure 21 is a schematic plan view of a series of separate presses employed with the preferred embodiment of the invention, and showing the transfer on the right end.
Figure 22:
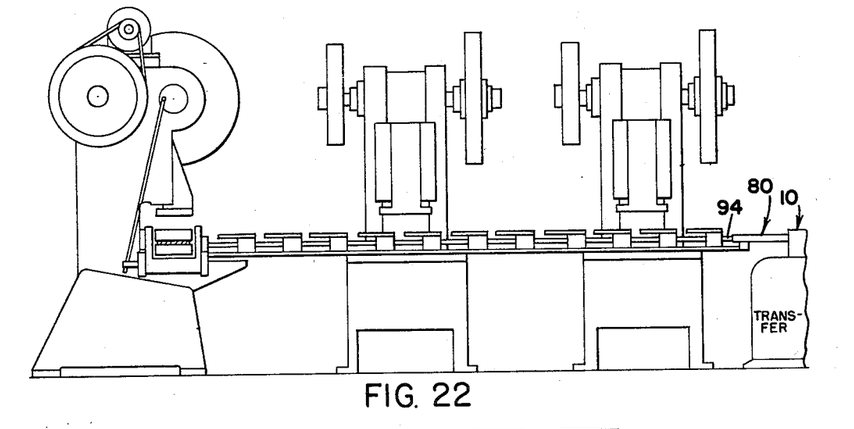
Figure 22 is an elevational view of Figure 21.
Figure 23:
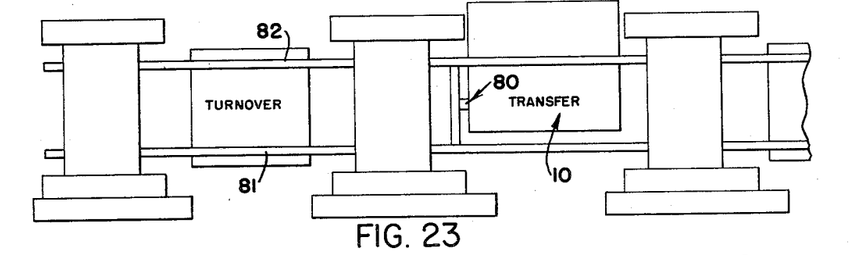
Figure 23 is a schematic plan view of another preferred embodiment of the invention in which the transfer feed console is positioned in the center of a bank of presses in tandem.
Figure 24:
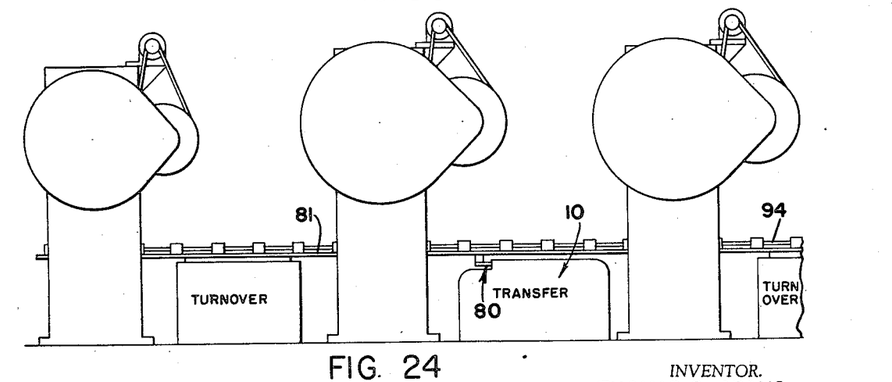
Figure 24 is an elevational view of Figure 23.

Figures 21 and 22 are plan and elevational views respectively illustrating an arrangement whereby a bank of presses may be aligned in tandem with the console at one end and with yet an additional press at the opposite end of the conveyor means associated with the console. Yet another arrangement is illustrated in Figures 23 and 24 showing plan and elevational views respectively wherein the console is positioned intermediate a bank of presses in tandem when an exceptionally long conveyor is required, or for other space conserving considerations. It is also indicated in Figure 24 that workpiece turnover means may be positioned between presses.

Figure 25:
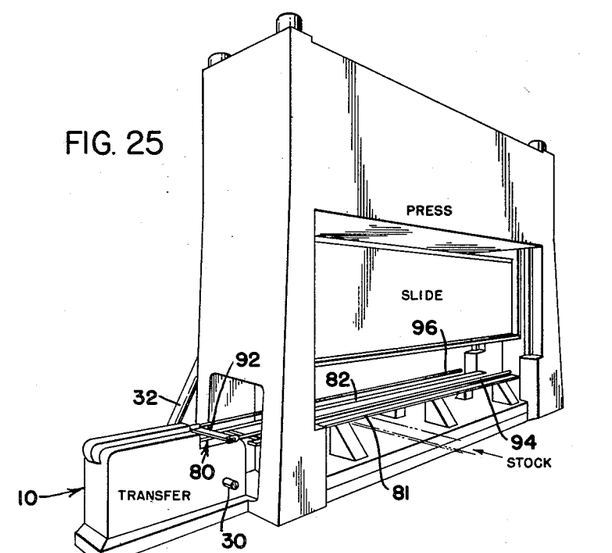
Figure 25 is a schematic perspective view of a preferred embodiment of the invention showing the transfer feed console in association with a press; and, Figure 26 is an exploded perspective view of a preferred arrangement of parts employed in the mechanism.

Finally in Figure 25, the console is shown adjacent to one end of a press wherein the conveyor means is mounted to enter through the side of the press.

It follows therefore that the console is a very versatile and adaptable workpiece feed means which can be modified to successfully index workpieces under most conceivable combinations of circumstances and conditions. It is to be understood that the embodiments of the invention shown herein are by way of example only and are not intended to be construed in a limiting sense. It is believed that the foregoing discussion and illustration will enable those skilled in the art to practice the invention; that other arrangements and modifications will occur to those guided by the teaching of this invention; and that other arrangements may be resorted to without departing from the scope of the invention.

I claim:

1. A work feed console of the class described comprising: a console housing; a cylindrical cam member rotatably journaled in said housing; said cam member having a pair of cam grooves; a first cam follower associated with one of said cam grooves; a second cam follower associated with the other of said cam grooves; a rocker arm pivotally journaled in said housing for movement about a horizontal axis; connecting means between said first cam follower and one end of said rocker arm; rack means immovably secured to said console; first rack means slidably secured to said console housing; first gear means adapted to simultaneously engage said immovable and said slidable rack means; connecting means between said gear means and the other end of said rocker arm; second slidable rack means connected to said second cam follower; third slidable rack means; second gear means adapted to simultaneously engage said second and third slidable rack means, said first and second gear means being rotatably journaled on a common shaft, and means to rotate said cylindrical cam, whereby said first and third slidable rack means are moved in unison responsive to the movement of said first cam follower, thereafter said third slidable rack means is moved responsive to the movement of said second cam follower, following which the sequence of rack movement is reversed by contined movement of said cam followers to complete the cycle.

2. A workfeed console of the class described comprising; a workpiece conveyor frame; a pair of workpiece conveyor bars slidably mounted on said frame; a pair of workpiece handling arms shiftably mounted on said conveyor bars; a pair of slidable rods mounted on said conveyor bars and operably secured to said arms to shift said arms relative to a workpiece centered therebetween; a console housing; a first pair of gear racks secured to said housing, one of said racks being shiftable and the other of said racks being fixed; a pair of gears rotatably journaled about a common axis and adapted to run on said first pair of gear racks; a second pair of gear racks shiftably secured to said console for engagement by said pair of gears; means to consecutively shift and then render immobile said first-mentioned shiftable rack; and means thereafter to rotate said pair of gears; connecting means between said conveyor bars and the one of said second pair of shiftable gear racks engaged by said fixed rack engaging gear; and connecting means between said pair of slidable rods and the other of said second pair of gear racks, whereby said pair of slidable rods are shifted to actuate said work-handling arms, and thereafter said slidable rods and said conveyor bars are shifted in unison from one position to a second position.

3. The workfeed console set forth in claim 2 wherein the means to actuate said workfeed arms comprises: a pinion journaled on each of said conveyor bars; a pinion shaft extension integral with each pinion; a workpiece engaging arm secured to each pinion shaft extension; and a pinion rack segment secured to each slidable rod adjacent each pinion, whereby movement of said slidable rods relative to said conveyor bars actuates said arms.

4. The workfeed console set forth in claim 2, wherein the means to actuate said workfeed arms comprises: a pinion journaled on each of said conveyor bars; a pinion rack segment secured to each slidable rod adjacent to and in engagement with each pinion; and a pinion rack segment secured to each workfeed arm adjacent to and in engagement with each pinion, whereby movement of said slidable rods relative to said conveyor bars actuates said arms.

5. The workfeed console set forth in claim 2, wherein the means to actuate said workfeed arms comprises: a pinion journaled on each of said conveyor bars; a pinion rack segment secured to each slidable rod adjacent to and in engagement with each pinion; a pinion rack segment transversely positioned relative to each conveyor bar and in engagement with each pinion; a rotatably journaled workpiece engaging arm secured to each transverse pinion rack; a rocker arm secured to each rotatably journaled workpiece engaging arm; cam follower means on each end of said rocker arm; and a cam bar secured to said conveyor frame positioned for engagement by said cam follower means, said cam bar being adapted to rotate said cross arm 180°.

6. A workfeed console of the class described comprising: a console housing; a rocker arm pivotally mounted in said housing; a first gear rack immovably secured to said housing; a second gear rack shiftably secured to said housing; a first gear positioned to engage said first and second racks; connecting means between one end of said rocker arm and said first gear, a third gear rack shiftably secured to said housing; a fourth gear rack shiftably secured to said housing; a second gear positioned to engage said third and fourth gear racks, said second gear being secured to rotate about an axis common to said first gear; means to slidably reciprocate said third gear rack; means to render said third gear rack immovable; and means to pivot said rocker arm about its pivotal axis to rotate said first and second gears in unison, whereby said fourth gear rack is shiftable independent of said second gear rack, and thereafter said second and fourth gear racks are shiftable in unison.

7. The apparatus set forth in claim 6, wherein said means to pivot said rocker arm about its pivotal axis comprises: rotatable cam means; a drag link shiftably mounted in said console; a cam follower secured to one end of said drag link; and connecting means between the other end of said drag link and the other and of said rocker arm, said connecting means including a nut secured to said other end of said rocker arm and adjustable along the longitudinal axis of said rocker arm, and a plate member secured to said drag link having an elongated slot therein adapted to engage said nut, whereby the throw of said rocker arm is adjustable by adjusting said nut in said slot.

8. A work feed console of the class described comprising: a feed console housing; a first triad of gear racks secured to said housing, the center rack being shiftably secured to said console housing, and the outboard racks being immovably secured to said console housing; a triad of gears journaled about a common axis of rotation and adapted to run on said first triad of gear racks; a second triad of gear racks shiftably secured to said console for engagement by said triad of gears; means to first shift and then render immobile said center rack; and means thereafter to rotate said triad of gears, whereby the center racks of said triads of gear racks are shifted by the center gear of said triad of gears, and thereafter said triad of shiftable gear racks are shifted in unison by said triad of gears.

9. In a work feed console having workpiece engaging means, and means to shift an engaged workpiece from a first to a second work station, the improvement comprising: a housing supporting first and second pairs of gear racks, the first rack of said first pair being stationary, and said other racks being shiftable; and first and second gears arranged for independent rotation about a common axis and meshing with said first and second pairs of racks respectively; means to shift the first rack of said second pair of racks, whereby to actuate said workpiece engaging means; and means thereafter to rotate said pair of gears with the first rack of the second pair of racks stationary to actuate said workpiece shifting means and to shift said workpiece from a first to a second work station.

References Cited in the file of this patent
UNITED STATES PATENTS 2,894,616    Young ________________ July 14, 1959

UNITED STATES PATENT OFFICE

CERTIFICATE OF CORRECTION

Patent No. 2,934,194                          April 26, 1960

Thomas O. Adams

It is hereby certified that error appears in the printed specification of the above numbered patent requiring correction and that the said Letters Patent should read as corrected below.

Column 2, line 67, for "ti" read -- it --; same line 67, for "tha" read -- that --; column 5, line 42, for "contined" read -- continued --; column 6, line 47, for "dnd", second occurrence, read -- end --.

Signed and sealed this 13th day of December 1960.

(SEAL)
Attest:

KARL H. AXLINE                                    ROBERT C. WATSON
Attesting Officer                                   Commissioner of Patents